United States Patent
Bhalla et al.

(10) Patent No.: US 7,411,927 B1
(45) Date of Patent: Aug. 12, 2008

(54) OPTIMIZATION OF POINT-TO-POINT SESSIONS

(75) Inventors: Rajesh Bhalla, Westmont, IL (US); Arghya T. Mukherjee, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1284 days.

(21) Appl. No.: 10/072,055

(22) Filed: Feb. 5, 2002

(51) Int. Cl.
  *H04Q 7/00* (2006.01)
  *H04Q 7/24* (2006.01)
  *H04L 12/66* (2006.01)

(52) U.S. Cl. .................. 370/331; 370/338; 370/352

(58) Field of Classification Search ............ 370/409
  See application file for complete search history.

(56) References Cited

U.S. PATENT DOCUMENTS

| | | | |
|---|---|---|---|
| 5,952,932 A * | 9/1999 | Sørensen ................ 340/3.5 |
| 6,628,671 B1 * | 9/2003 | Dynarski et al. ........... 370/469 |
| 6,665,537 B1 | 12/2003 | Lioy ......................... 455/435 |
| 6,834,050 B1 * | 12/2004 | Madour et al. ............. 370/392 |
| 6,845,236 B2 * | 1/2005 | Chang ..................... 455/414.1 |
| 6,876,640 B1 * | 4/2005 | Bertrand et al. ............ 370/331 |
| 6,904,033 B1 * | 6/2005 | Perras et al. ............... 370/338 |
| 6,985,464 B2 * | 1/2006 | Harper et al. ............... 370/331 |
| 6,987,764 B2 * | 1/2006 | Hsu .......................... 370/390 |
| 2002/0021681 A1 * | 2/2002 | Madour .................... 370/331 |
| 2003/0053431 A1 * | 3/2003 | Madour .................... 370/331 |
| 2003/0099219 A1 * | 5/2003 | Abrol et al. ............... 370/338 |
| 2003/0119519 A1 * | 6/2003 | Madour et al. ............. 455/453 |

FOREIGN PATENT DOCUMENTS

| | | |
|---|---|---|
| EP | 0 999 672 A2 | 5/2000 |
| EP | 1 148 749 A2 | 10/2001 |
| WO | WO 01/67786 A2 | 9/2001 |

OTHER PUBLICATIONS

PCT Search Report dated Jul. 28, 2003, for Application No. PCT/US 03/03288, filed Feb. 4, 2003, 7 pgs.
"3GPP2 Access Network Interfaces Interoperability Specification" Revision A (3G-IOSv4.1), 3rd Generation Partnership Project 2 "3GPP2", Jun. 2001, pp. 108-111, 133-136, 175-176, 179-181, 187-198 XP002245651, retrieved from the Internet: ,<URL:http://www.3gpp2.org/Public_html/spec s/A.S0001-A_v2.O.pdf>.
McCann, et al., "An Internet Infrastructure for Cellular CDMA Networks Using Mobile IP", IEEE Personal Communications, IEEE Communications Society, US, vol. 7, No. 4, Aug. 2000, pp. 26-32 XP000954657.

* cited by examiner

*Primary Examiner*—Daniel J Ryman
(74) *Attorney, Agent, or Firm*—Baker Botts L.L.P.

(57) ABSTRACT

According to one embodiment of the present invention, a method of optimizing point-to-point sessions is disclosed. A registration request is received from a mobile node. The mobile node communicates with a current packet controller function serviced by a packet data serving node. Whether the registration request comprises a previous access network identifier is determined. The previous access network identifier identifies a previous packet controller function. Whether the mobile node is serviced by a mobile Internet Protocol is determined. Next, whether the mobile node communicated with a previous packet controller function serviced by the packet data serving node is determined. The method concludes by deciding whether to negotiate a point-to-point session for the mobile node in response to on the determinations.

41 Claims, 3 Drawing Sheets

FIG. 3A

OPTIMIZATION OF POINT-TO-POINT SESSIONS

TECHNICAL FIELD OF THE INVENTION

This invention relates in general to communications networks, and more particularly to optimization of point-to-point sessions.

BACKGROUND OF THE INVENTION

During transmission of a call, a mobile node such as a cellular phone may communicate with a network element of a data network by establishing a point-to-point session with the network element. As the mobile node moves from one location to another location, a call from the mobile node may be handed off from one network element to another network element. Handing off the call, however, may require renegotiation of the point-to-point session, which may result in increased latency and reduced performance of the data network. As a result, known techniques for processing packet data may be inadequate for many needs.

SUMMARY OF THE INVENTION

In accordance with the present invention, the disadvantages and problems associated with optimizing point-to-point sessions for a mobile node have been substantially reduced or eliminated.

According to one embodiment of the present invention, a method of optimizing point-to-point sessions is disclosed. A registration request is received from a mobile node. The mobile node communicates with a current packet controller function serviced by a packet data serving node. Whether the registration request comprises a previous access network identifier is determined. The previous access network identifier identifies a previous packet controller function. Whether the mobile node is serviced by a mobile Internet Protocol is determined. Next, whether the mobile node communicated with a previous packet controller function serviced by the packet data serving node is determined. The method concludes by deciding whether to negotiate a point-to-point session for the mobile node in response to on the determinations.

Technical advantages of certain embodiments of the present invention may include optimizing renegotiation of point-to-point sessions for a mobile node. If a mobile node travels from one location to another location, and in both locations the mobile node is communicating with the same packet data serving node, renegotiation of the point-to-point session may be redundant. In such instances, the mobile node and the packet data serving node may use the original point-to-point session to communicate with each other.

Other technical advantages of certain embodiments of the present invention may include optimizing renegotiation of point-to-point sessions without storing additional information at the mobile node. Thus, the packet data serving node may be operable to optimize renegotiation of point-to-point sessions without requiring additional storage space at the mobile node.

Other technical advantages may be readily apparent to one skilled in the art from the figures, descriptions and claims included herein. None, some, or all of the examples may provide technical advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
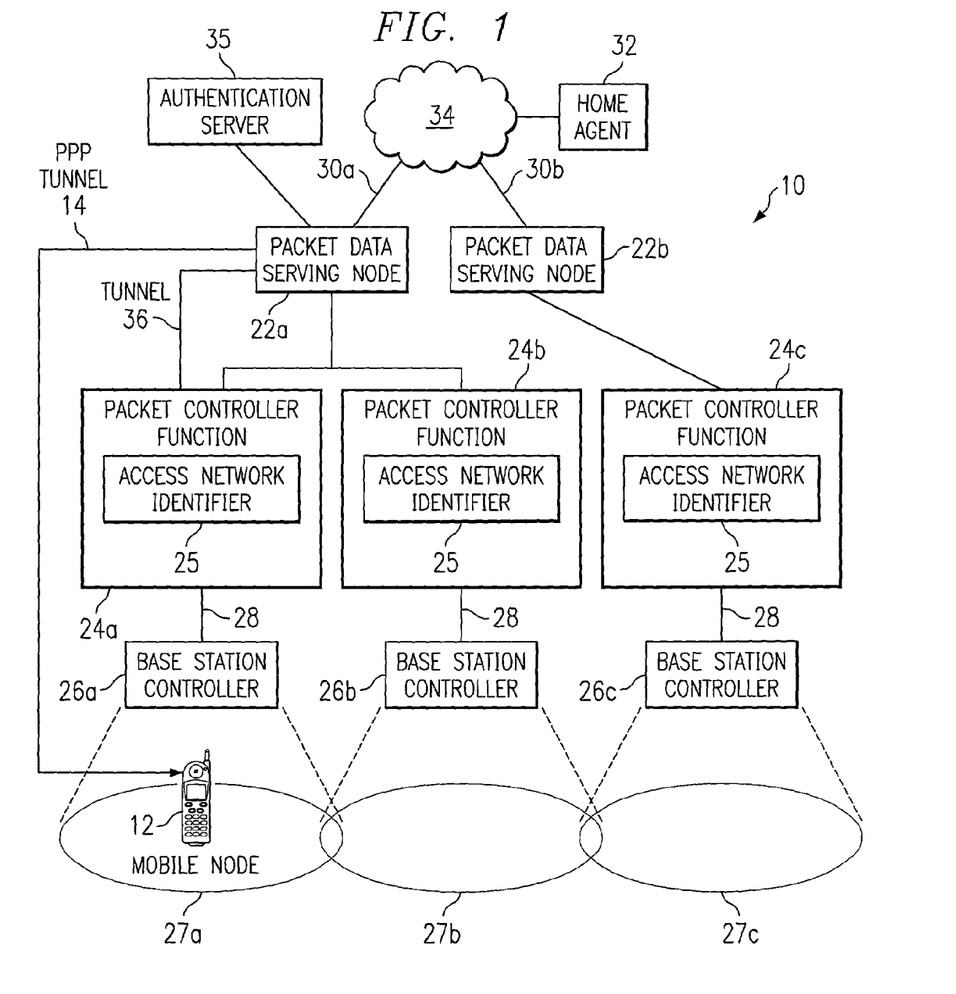
FIG. 1 illustrates an example of a system for optimizing point-to-point sessions for a mobile node.

FIG. 1 illustrates an example of a system 10 for optimizing point-to-point sessions 14 for a mobile node 12. System 10 may include, for example, a part of a packet data network. A point-to-point session 14 may be established to communicate data packets between a mobile node 12 and other network elements. As the mobile node 12 moves from one location to another location, a call may be transferred from one base station controller 26 of system 10 to another base station controller 26 of system 10. To optimize renegotiation of point-to-point sessions 14, system 10 identifies network elements common to the two base station controllers 26 and determines whether renegotiation of the point-to-point session 14 may be redundant.

System 10 may include a home agent 32, packet data serving nodes 22, packet controller functions 24, and base station controllers 26, which may be used to process a call from a mobile node 12. A call from mobile node 12 may comprise packet data such as voice, data, video, multimedia, or other type of data packets, or any combination of the preceding. Mobile node 12 may comprise, for example, a cellular telephone, a personal computer, a personal digital assistant, a mobile handset, or any other device suitable for communicating packet data to system 10. Mobile node 12 may utilize, for example, code-division multiple access technology or any other suitable mobile communications technology. Mobile node 12 may support, for example, simple Internet Protocol (SIP), mobile Internet Protocol (MIP), or any other suitable communications protocol.

Base station controllers 26 provide an interface between mobile node 12 and packet data serving nodes 22. The wireless link between mobile node 12 and base station controller 26 is typically a radio frequency link and is typically cellular in network organization. Base station controller 26 communicates data packets received from mobile node 12 to the packet controller function 24 through a communication path 28. Packet controller function 24 operates as a fast packet switch providing virtual circuit services between base station controller 26 and packet data serving node 22. Packet controller function 24 may communicate with a single base station controller 26 or with multiple base station controllers 26. Packet controller function 24 may include an access network identifier (ANID) 25 unique to the particular packet controller function 24. Access network identifier 25 may be used to identify the particular packet controller function 24 servicing mobile node 12. The packet controller function 24 may then forward the data packets to the packet data serving node 22.

Packet data serving node 22 establishes a tunnel connection 36 with packet controller function 24. Tunnel connection 36 enables packet data serving node 22 to communicate commands and data to packet controller function 24 over the Internet or other IP-based network. A security association may be established between packet data serving node 22 and packet controller function 24 such that data transmitted through tunnel connection 36 is secure. For example, encrypted data packets may be encapsulated in an IP packet for secure transmission across the IP network.

Packet data serving nodes 22 provide access to the Internet, intranets, Wireless Application Protocol servers, or any other suitable network for mobile nodes Packet data serving node 22 acts as an access gateway for mobile nodes 12 and provides foreign agent support and packet transport for virtual networking. Packet data serving node 22 may comprise, for example, a CISCO Packet Data Serving Node, Cisco PDSN Release 1.1.

A communication path 30 may be used to transmit data between packet data serving node 22 and a home agent 32. Home agent 32 records the location of mobile node 12 and provides mobile Internet Protocol service to mobile node 12. Communication path 30 may comprise a portion of a communication network 34. Communication network 34 may comprise a public switched telephone network, a public or private data network, the Internet, a wired or wireless network, a local, regional, or global communicating network, any other suitable communication link, or any combination of the preceding.

Packet data serving node 22 establishes communication sessions, for example, point-to-point sessions 14, with mobile node 12 to provide mobile node 12 access to the packet data network. A security association may be established between packet data serving node 22 and mobile node 12 such that data transmitted through point-to-point session 14 is secure. Authentication, authorization, and accounting (AAA) server 35 provides security functions. For example, AAA server 35 may provide authentication services. Authentication provides a method of identifying users, including login and password dialog, challenge and response, messaging support, and, depending on the security protocol utilized, encryption. Authentication enables a packet data serving node 22 to identify before allowing the user access the packet data network and network services.

AAA server 35 may provide authorization services. Authorization may allow for remote access control, including one-time authorization or authorization for each service. Authorization may succeed by assembling a set of attributes that describe what the user is authorized to perform. These attributes may be compared to the information contained in a database for a given user and the result may be returned to packet data service node 22 to determine the user's actual capabilities and restrictions.

AAA server 35 may provide accounting services. Accounting allows for collecting and sending security server information used for billing, auditing, and reporting, such as user identities, start and stop times, executed commands (such as PPP), number of packets, and number of bytes. Accounting provides for tracking the services users are accessing as well as the amount of network resources the users are consuming.

In operation, as mobile node 12 moves from one location to another location, mobile node 12 may move from a cell 27*a* managed by one base station controller 26*a* to a cell 27*b* managed by another base station controller 26*b*. Consequently, it may be desirable to hand off a call from base station controller 26*a* to base station controller 26*b*.

As an example, a call may initiate from a cell 27*a* managed by base station controller 26*a*. Accordingly, packet data serving node 22*a* may establish a point-to-point session 14 with mobile node 12. During transmission of the call, mobile node 12 may move to a cell 27*b* not serviced by base station controller 26*a*. Instead, base station controller 26*b* may service mobile node 12 at the new cell 27*b*. In the example illustrated in FIG. 1, the packet data serving node 22*a* communicating with base station controller 26*b* is the same packet data serving node 22*a* that previously communicated with base station controller 26*a*. Renegotiation of point-to-point session 14, in this instance would be redundant as renegotiation would recreate an existing communications link.

As another example, mobile node 12 may move to a cell 27*c* serviced by base station controller 26*c*. In the example illustrated in FIG. 1, a different packet data serving node 22*b* is now in communication with base station controller 26*c*. Renegotiation of point-to-point session 14, in this instance would not be redundant as mobile node 12 has not previously communicated with packet data serving node 22*b*. Thus, packet data serving node 22*b* would establish a new point-to-point session 14 with mobile node 12.

In one embodiment of the present invention, packet data serving node 22*a* distinguishes between a hand off of a call between base station controllers 26 communicating with a single packet data serving node 22 and a hand off of a call between base station controllers 26 communicating with multiple respective packet data serving nodes 22. As previously described, the former hand off may occur when base station controller 26*a* hands off a call to base station controller 26*b*. The latter hand off may occur when base station controller 26*a* hands off a call to base station controller 26*c*. The handing off of a call is described in more detail in connection with FIG. 3.

The configurations of system 10 in FIG. 1 are merely exemplary. System 10 is not intended to be limited to this configuration. Base station controller 25*a* and base station controller 26*b* need not necessarily communicate with a common packet data serving node 22. Similarly, base station controller 26*a* and base station controller 26*c* need not necessarily communicate with different packet data serving nodes 22. One of ordinary skill in the art may appreciate that base station controllers may communicate with packet data serving nodes in a number of variations and configurations.

Figure 2:
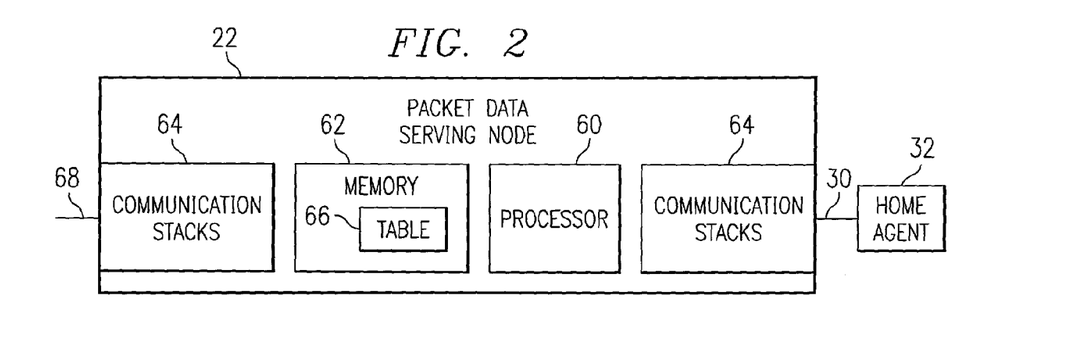
FIG. 2 illustrates an example of a packet data serving node.

FIG. 2 illustrates an example of a packet data serving node 22. Packet data serving node 22 may include a processor 60, a memory 62, and one or more communication stacks 64. Processor 60 controls the operation of packet data serving node 22. Data packets transmitted to packet data serving node 22 may be based on multiple communications protocols. Thus, communication stacks 64 determine the communications protocol associated with the data packets. Memory 62 stores a table 66 that records information relevant to a call.

In operation, packet data may be transmitted from packet controller function 24 to packet data serving node 22 using simple Internet Protocol (SIP), mobile Internet Protocol (MIP), or any other suitable communications protocol. The processor 60 receives packet data through input interface 68. When mobile node 12 sends a registration request (RRQ) to packet data serving node 22, processor 60 determines whether the packet data serving node 22 receiving the request has serviced the call at a previous time. The packet data serving node 22 keeps a record of previously serviced mobile nodes 12 for a fixed period of time that is negotiated at the time of the setup of the call between the packet controller function 24 and the packet data serving node 22. If packet data serving node 22 has no record of servicing the call, processor 60 may gather data packets received from mobile node 12 at input interface 68 and generate a new entry in table 66 for the call. If, on the other hand, processor 60 determines that the packet data serving node 22 receiving the request previously serviced to the call, processor 60 may retrieve a previously recorded entry for the call from table 66. Processor 60 may determine from the table entry whether to renegotiate the point-to-point session with mobile node 12.

Table 66 may include multiple fields storing information relevant to each call. For example, table 66 may take the form as shown in TABLE 1:

TABLE 1

|  | MSID | NAI | TOS | HA | IP address | CANID | PANID |
|---|---|---|---|---|---|---|---|
| Call 1 | 12568 | xyz.com | SIP | HA1 | 10.10.100 | 526243 | 526212 |
| Call 2 | 12675 | smith | MIP | HA1 | 10.10.200 | 526212 | 0 |

The mobile station identifier (MSID) field in table 66 may comprise unique identifier such as a number or symbol that identifies a particular mobile node 12. The MSID may enable mobile node 12 to access the network. MSID may comprise a mobile identification number, an international roaming number, an international mobile station identifier, a mobile identifier number, an electronic serial number, or any other suitable identifier. For example, the MSID may comprise a series of two or more number as illustrated in TABLE 1.

The network access identifier (NAI) field of table 66 may comprise an identifier that identifies the user of mobile node 12. For example, the NAI may include the name of a person, the name of a corporation, or any other identifier suitable for identifying the user. For example, the NAI could be "xyz.com" or "smith."

The type of service (TOS) field in table 66 describes the type of service provided to mobile node 12 by home agent 32. For example, the TOS may include mobile Internet Protocol (MIP) service, simple Internet Protocol (SIP) service, or any other suitable type of service. For example, the TOS field may include "SIP" or "MIP."

The home agent field (HA) of table 66 identifies the home agent 32 that is associated with mobile node 12. Mobile node 12 registers its presence at a remote location though a foreign agent. The foreign agent communicates with the home agent 32 in order to forward data packets to the remote subnet. The foreign agent may comprise the packet data serving node 22 communicating with mobile node 12 in a particular cell. For example, the home agent 32 may be identified by a number such as "HA1."

The Internet Protocol address field of table 66 identifies a packet data serving node 22 communicating with mobile node 12 in a particular cell 27. An Internet Protocol address may belong to one of five classes and may be written in dotted decimal notation as four octets separated by periods. Each address may include a network number and, optionally, a subnetwork number. For example, the Internet Protocol address for a packet data service node 22 may be "10.10.xx." The Internet Protocol address for a packet data service node 22 may be consistent.

The access network identifier (ANID) field identifies a packet controller function 24 that is managing the call. Each packet controller function 24 of system 10 may be assigned a unique access network identifier 25. The access network identifier 25 may comprise a number or symbol unique to the packet controller function 24. The current access network identifier field (CANID) of table 66 indicates the current packet controller function 24 managing the call. The previous access network identifier field (PANID) of table 66 indicates the previous packet controller function 24 that managed the call.

When mobile node 12 moves to a new cell 27, the packet data serving node 22 of the new cell may receive a registration request (RRQ) from mobile node 12. The packet data serving node 22 distinguishes between a hand off of a call between base station controllers 26 communicating with a single packet data serving node 22 and a hand off of a call between base station controllers 26 communicating with multiple respective packet data serving nodes 22.

The arrangement of information for a call in table 66 is merely exemplary. Table 66 is not intended to be limited to any particular arrangement of information for a call. One of ordinary skill in the art may appreciate that the fields of information stored in table 66 may be arranged in any order. Additionally, table 66 may include some of the above described fields, none of the above described fields, and any other suitable fields for storing information relevant to a call.

Figure 3A:
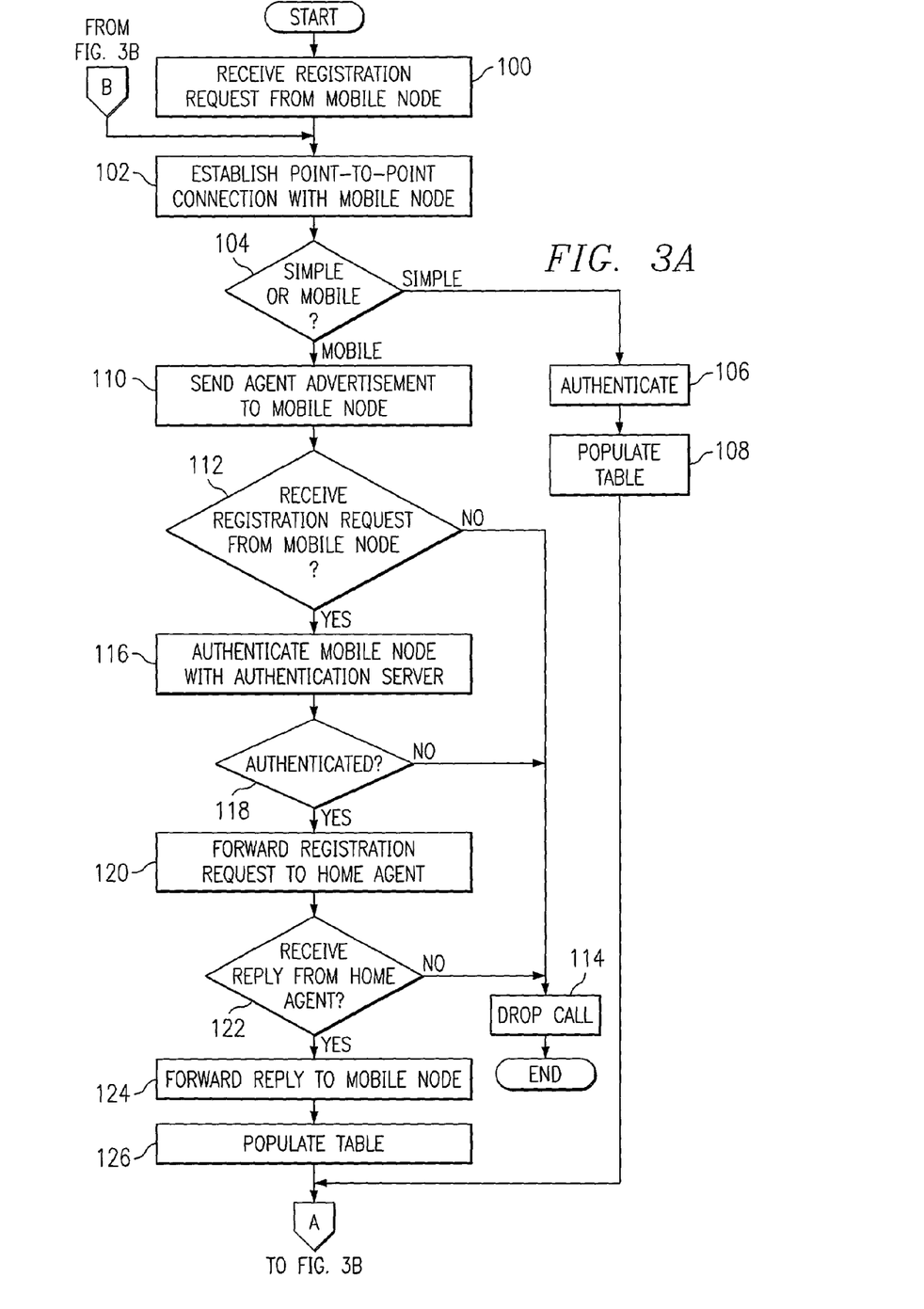
FIG. 3 illustrates an example of a method for optimizing point-to-point sessions for a mobile node.
Figure 3B:
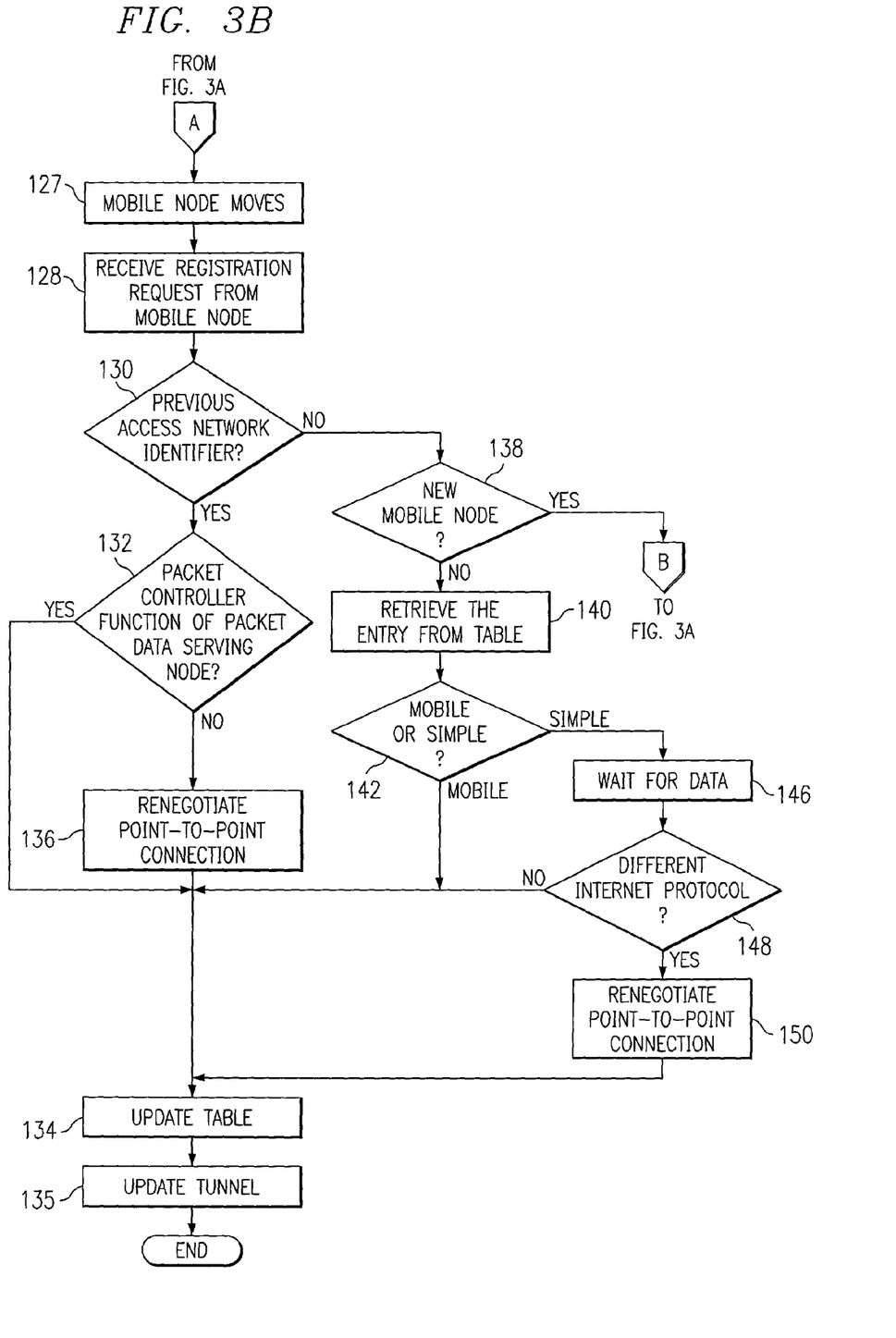

FIG. 3 illustrates an example of a method for optimizing point-to-point sessions for a mobile node. Specifically, steps 100 through 126 illustrate an example of a method for populating a table 66 stored in memory 62 of packet data serving node 22. The method begins at step 100, where packet data serving node 22 receives a registration request (RRQ) from mobile node 12. Mobile node 12 transmits the RRQ to packet data serving node 22 to initiate communication with packet data serving node 22 and set up a virtual circuit between the mobile node 12 and packet data serving node 22. Mobile node 12 communicates data to base station controller 26, which in turn communicates the data to packet controller function Packet controller function 24 then communications the data to packet data serving node 22, which in turn communicates the data to home agent 32 over communication path 30. Packet data serving node 22 may recognize a new mobile node 12 and generate a new entry in table 66.

At step 102, point-to-point session 14 is established to communicate data packets between mobile node 12 and packet data service node 22. A security association may be established between packet data serving node 22 and mobile node 12 such that data transmitted through point-to-point session 14 is secure. Packet data service node 22 may determine whether the type of service is simple Internet Protocol or mobile Internet Protocol at step 104. If the mobile node requests an Internet Protocol address, packet data serving node 22 will determine that simple Internet Protocol is servicing the mobile node. If, on the other hand, the mobile node does not request an Internet Protocol address, the type of service is mobile Internet Protocol. The determination indicates to packet data service node 22 the steps that may be taken to populate table 66.

If packet data service node 22 determines at step 104 that the type of service supporting mobile node 12 is simple Internet Protocol, the method proceeds to step 106. At step 106, packet data service node 22a authenticates mobile node 12. Packet data service node 22a communicates with AAA server 35, and AAA server 35 performs security functions that may include authentication, authorization, accounting, or other suitable security functions. Once authenticated, packet data service node 22 populates table 66 at step 108. To populate table 66, packet data service node 22 may gather data that identifies the mobile node 12, the user, the type of service, and the home agent 32. Packet data service node 22 may also store the Internet Protocol address assigned to the packet data serving node 22 in table 66. The current access network identifier, which identifies the packet controller function 24 associated with base station controller 26, may also be stored in table 66. Because the call is serviced by simple Internet Protocol, the previous access network identifier may be set to zero. Packet data serving node 22 may store the information in appropriate fields. Following population of table 66, the method proceeds to step 128.

If at step 104, packet data service node 22 determines that the type of service is mobile Internet Protocol, the method proceeds to step 110. At step 110, packet data serving node 22 sends an agent advertisement to mobile node 12. The agent advertisement may be communicated over point-to-point session 14 and may facilitate the establishment of the mobile Internet Protocol address between mobile node 12 and home agent 32. In response, mobile node 12 sends packet data serving node 22a a mobile Internet Protocol-Registration Request (MIP-RRQ). The MIP-RRQ may include the mobile Internet Protocol address of mobile node 12.

At step 112, packet data serving node 22 determines whether the MIP-RRQ has been received. If packet data serving node 22 has not received the MIP-RRQ, the call is dropped at step 114, and the method ends. If packet data serving node 22 has received the MIP-RRQ, the method proceeds to step 116.

Packet data serving node 22 authenticates mobile node 12 with the AAA server 35 at step 116. AAA server 35 may provide different security functions. For example, authentication may enable packet data serving node 22 to identify a user before allowing the user to access the packet data network and network services. Authorization may provide the method for remote access control, including one-time authorization or authorization for each service. Accounting may enable the packet data serving node 22 to track the services users are accessing as well as the amount of network resources the users are consuming.

Packet data serving node 22 determines whether the call has been authenticated at step 118. If the call has not been authenticated, the call may be dropped at step 114. If the call has been authenticated, the MIP-RRQ is forwarded to home agent 32 at step 120. Forwarding the MIP-RRQ to the home agent 32 initiates an association between the mobile node 12, the home agent 32, and the packet data serving node 22. In response, home agent 32 may communicate the mobile Internet Protocol address for mobile node 12 to packet data serving node 22, which declares the packet data serving node 22 a foreign agent currently handling the mobile node. At step 122, packet data serving node 22 determines whether it has received the mobile Internet Protocol address from home agent 32. If the packet data serving node 22 has not received the mobile Internet Protocol address, the call may be dropped at step 114. If the packet data serving node 22 has received the mobile Internet Protocol address, the packet serving node 22 may forward the reply of home agent 32 that includes the mobile Internet Protocol address to mobile node 12. Communication of the mobile Internet Protocol address may be transmitted over point-to-point session 14. Thus, by serving as a foreign agent, packet data serving node 22 facilitates the establishment of the mobile Internet Protocol address between mobile node 12 and home agent 32.

At step 126, packet data service node 22 may populate table 66. To populate table 66, packet data service node 22 may gather data that identifies the mobile node 12, the user, the type of service, and the home agent 32. The data may be stored in appropriate fields of table 66. Packet data serving node 22 may also store the Internet Protocol address corresponding to the packet data serving node 22 in table 66. The current access network identifier, which identifies the packet controller function 24a associated with base station controller 26, may also be stored in table 66. Because the call is serviced by mobile Internet Protocol, the previous access network identifier may also be stored in table 66. Following population of table 66, the method proceeds to step 128.

Steps 127 through 150 illustrate an example method of a method for optimizing the establishment of point-to-point sessions after mobile node 12 travels from one cell 27 into a new cell 27. Table 66 is populated at step 108 or 126, depending on whether the type of service is simple Internet Protocol or mobile Internet Protocol, respectively. The call may have been initiated from cell 27a while packet data serving node 22a was providing service to mobile node 12. Subsequently, at step 127 mobile node 12 may move into a new cell 27b serviced by the original packet data serving node 22a or into a new cell 27c serviced by a new packet data serving node 22b.

The method continues at step 128, where the packet data service node 22 receives a registration request (RRQ) from mobile node 12. Mobile node 12 transmits the RRQ to packet data serving node 22 to initiate communication with packet data serving node 22 after mobile node 12 moves into the new cell 27.

At step 130, packet data serving node 22 determines whether the RRQ includes a previous access network identifier (PANID). The RRQ may include a previous access network identifier if the registration request identifies the packet controller function 24a that previously serviced mobile node 12 and the method proceeds to step 132. At step 132, the packet data serving node 22 may determine whether the packet controller function 24b or 24c of the new cell communicates with the same packet data serving node 22 as did packet controller function 24a.

If the packet controller function 24 of the old cell 27 and the packet controller function 24 of the new cell 27 communicate with the same packet data serving node 22, the method proceeds to step 134. In the example illustrated in FIG. 1, the packet controller function 24 of the old cell 27a comprises packet controller function 24a. The packet controller function of the new cell 27b comprises packet controller function 24b. At step 134, table 66 may be updated. Updating table 66 may include replacing the Internet Protocol address, the previous access network identifier, and the current access network identifier fields to reflect updated information for the new cell in which mobile node 12 is located. After updating table 66, packet data service node 22 updates the tunnel at step 135. Updating the tunnel may include establishing a new tunnel connection 36 between packet data serving node 22a and packet controller function 24b.

If instead at step 132, the system 10 determines that the packet controller function 24 of the new cell 27 and the packet controller function 24 of the old cell 27 do not communicate with the same packet data serving node 22, the method proceeds to step 136. In the example embodiment illustrated in FIG. 1, the packet controller function 24 of the old cell 27a comprises packet controller function 24a. The packet controller function of the new cell 27c comprises packet controller function 24c. At step 136, packet data serving node 22b renegotiates point-to-point session 14. Renegotiation may be a lengthy process as the packet data serving node 22 and the mobile node 12 may communicate a series of messages back and forth between each other to set up renegotiation of the point-to-point session. Point-to-point session 14 may be re-established to communicate data packets between mobile node 12 and packet data service node 22b or 22c.

After renegotiation, table 66 may be updated at step 134. Updating table 66 may include replacing the Internet Protocol address, the previous access network identifier, and the current access network identifier fields to reflect updated information for the new cell 27c in which mobile node 12 is located. After updating table 66, packet data service node 22b updates the tunnel at step 135. Updating the tunnel may include establishing a new tunnel connection 36 with packet controller function 24c. Tunnel connection 36 enables packet data serving node 22b to communicate commands and data to packet controller function 24c over the Internet or other IP-based network. After updating the tunnel, the method terminates.

Returning to step 130, if the packet data serving node 22 determines that the registration request does not include a previous access network identifier (PANID), the step proceeds to step 138. At step 138, packet service node 22 may determine the session context. Determining the session context may include comparing the mobile station identifier (MSID) of mobile node 12 with the mobile station identifiers stored in table 66 to determine whether the packet data serving node 22 has previously provided service to mobile node 12. If the packet data serving node 22 determines that the mobile station identifier of mobile node 12 is not listed in table 66, the method returns to step 102 of FIG. 3A. If, on the other hand, the packet data serving node 12 has previously provided service to mobile node 12, the mobile station identifier of the mobile node 12 is listed in table 66, and the packet service node 22 may retrieve the matching entry from table 66 at step 140.

Packet service node 22 determines whether the type of service is simple Internet Protocol or mobile Internet Protocol at step 142. The determination may be made by reading the type of service for mobile node 12 as stored in the TOS field in table 66. If the type of service is mobile, the method proceeds to step 134. Since packet data serving node 22a would be recreating the same communications link, renegotiation of point-to-point session 14 may not be required. Rather, table 66 may be updated at step 134. Updating table 66 may include sending an agent advertisement to mobile node 12. In response, mobile node 12 sends packet data serving node 22 a MIP-RRQ. The MIP-RRQ may be forwarded to home agent 21 who then responds by sending the mobile Internet Protocol address for mobile node 12 to packet data serving node 12. Packet data serving node 12 then update table 66 by replacing the Internet Protocol address, the previous access network identifier, and the current access network identifier fields to reflect updated information for the new cell in which mobile node 12 is located. After updating table 66, packet data service node 22b updates the tunnel at step 135. Updating the tunnel may include establishing a new tunnel connection 36 with packet controller function 24c.

If packet service node 22 determines at step 142 that the type of service is simple Internet Protocol, the method proceeds to step 146. At step 146, packet service node 22 waits for data packets from mobile node 12. At step 148, packet data service node 22 may compare the Internet Protocol address of mobile node 12 to the Internet Protocol address stored in table 66 for mobile node 12. If the Internet Protocol addresses are not the same or substantially similar, packet data service node 22b may negotiate point-to-point-session 14 at step 150. Point-to-point session 14 may be re-established to communicate data packets between mobile node 12 and packet data service node 22b. If at step 148 the Internet Protocol addresses are the same or substantially similar, negotiation of point-to-point session 14 would be redundant, as packet data serving node 22a would be recreating the same communications link. In this scenario, the method skips step 150 and proceeds to step 134.

At step 134, table 66 is updated. Updating table 66 may include replacing the Internet Protocol address and the current access network identifier fields to reflect information correct for the new cell in which mobile node 12 is located. Because the type of service is simple Internet Protocol, the previous access network identifier may be set to zero. After updating table 66, packet data service node 22 updates tunnel 36 at step 135. Updating tunnel 36 may include establishing a new tunnel connection 36 with packet controller function 24. Tunnel connection 36 enables packet data serving node 22 to communicate commands and data to packet controller function 24 over the Internet or other IP-based network. After updating the tunnel, the method terminates.

System 10 for optimization of point-to-point sessions 14 may proceed through the optimization process in the order as shown in steps 100-150 in FIG. 3 and as described above. It is recognized, however, that one skilled in the art may perform the steps of the method in any suitable order.

Technical advantages of certain embodiments of the present invention may include optimizing renegotiation of point-to-point sessions for a mobile node. If a mobile node travels from one location to another location, and in both locations the mobile node is communicating with the same packet data serving node, renegotiation of the point-to-point session may be redundant. In such instances, the mobile node and the packet data serving node may use the original point-to-point session with communicate to each other. Another technical advantage may include optimizing renegotiation of point-to-point sessions without storing additional information at the mobile node. Thus, the packet data serving node may be operable to optimize renegotiation of point-to-point sessions without requiring additional storage space at the mobile node.

Other technical advantages may be readily apparent to one skilled in the art from the figures, descriptions and claims included herein. None, some, or all of the examples may provide technical advantages.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer-readable medium encoded with a data structure operable to perform the following:
   communicating, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
   receiving, through the tunnel, a registration request from a mobile node, the mobile node communicating with the current packet controller function;
   determining, at the packet data serving node, whether the registration request comprises a previous access network identifier identifying a previous packet controller function;
   determining, at the packet data serving node, whether the mobile node is serviced by a mobile Internet Protocol;
   determining, at the packet data serving node, whether the mobile node communicated with a previous packet controller function serviced by the packet data serving node; and
   deciding, at the packet data serving node, whether to negotiate a point-to-point session for the mobile node in response to the determinations.

2. The computer-readable medium of claim 1, wherein the registration request comprises a request for service at the packet data serving node.

3. The computer-readable medium of claim 1, wherein deciding whether to negotiate the point-to-point session for the mobile node comprises:

negotiating the point-to-point session if the mobile node did not communicate with a previous packet controller function serviced by the packet data serving node; and updating the point-to-point session if the mobile node communicated with a previous packet controller function serviced by the packet data serving node.

4. The computer-readable medium of claim 1, wherein deciding whether to negotiate the point-to-point session for the mobile node comprises:

determining whether there is a session context for the mobile node;

negotiating the point-to-point session if there is no session context; and updating the point-to-point session if there is session context.

5. The computer-readable medium of claim 1, wherein:

determining, at the packet data serving node, whether the registration request comprises the previous access network identifier further comprises:

determining that the registration request comprises the previous access network identifier; and identifying the previous packet controller function from the previous access network identifier;

determining, at the packet data serving node, whether the mobile node communicated with the previous packet controller function further comprises:

determining whether the previous packet controller function is serviced by the packet data serving node;

negotiating the point-to-point session if the previous packet controller function is not serviced by the packet data serving node; and updating the point-to-point session if the previous packet controller function is serviced by the packet data serving node.

6. The computer-readable medium of claim 1, wherein the data structure is further operable to perform the following:

generating a table comprising an entry associated with the mobile node, the entry comprising a mobile node identifier, a previous access network identifier, and a current access network identifier.

7. The computer-readable medium of claim 6, wherein the data structure is further operable to perform the following:

updating a tunnel connection operable to communicate a plurality of data packets between the current packet controller function and the packet data serving node by updating the entry associated with the mobile node.

8. A computer-readable medium encoded with a data structure operable to perform the following:

communicating, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;

receiving, through the tunnel, a registration request from a mobile node, the mobile node communicating with the current packet controller function;

determining, at the packet data serving node, whether the registration request comprises a previous access network identifier identifying a previous packet controller function;

determining, at the packet data serving node, whether the mobile node is serviced by a mobile Internet Protocol or a simple Internet Protocol;

determining, at the packet data serving node, whether the mobile node communicated with a previous packet controller function serviced by the packet data serving node;

deciding, at the packet data serving node, whether to negotiate a point-to-point session for the mobile node in response to the determinations;

if the mobile node is serviced by the simple Internet Protocol:

determining whether a first Internet Protocol address associated with the mobile node is the same as a second Internet Protocol address associated with the mobile node, the first Internet Protocol address associated with a message received from the mobile node, the second Internet Protocol address stored at the packet data serving node;

negotiating the point-to-point session, if the first Internet Protocol address is not the same as the second Internet Protocol address; and updating the point-to-point session, if the first Internet Protocol address is the same as the second Internet Protocol address.

9. A computer-readable medium encoded with a data structure operable to perform the following:

communicating, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;

receiving, through the tunnel, a registration request from a mobile node, the mobile node communicating with the current packet controller function;

determining, at the packet data serving node, whether the mobile node is serviced by a mobile Internet Protocol;

determining, at the packet data serving node, whether the mobile node communicated with a previous packet controller function serviced by the packet data serving node; and deciding, at the packet data serving node, whether to negotiate a point-to-point session for the mobile node in response to the determinations.

10. The computer-readable medium of claim 9, wherein the registration request comprises a request for service at the packet data serving node.

11. The computer-readable medium of claim 9, wherein deciding whether to negotiate the point-to-point session for the mobile node comprises:

negotiating the point-to-point session if the mobile node did not communicate with a previous packet controller function serviced by the packet data serving node; and updating the point-to-point session if the mobile node communicated with a previous packet controller function serviced by the packet data serving node.

12. The computer-readable medium of claim 9, wherein deciding whether to negotiate the point-to-point session for the mobile node comprises:

determining whether there is a session context for the mobile node;

negotiating the point-to-point session if there is no session context; and updating the point-to-point session if there is session context.

13. The computer-readable medium of claim 9, wherein the data structure is further operable to perform the following:

generating a table comprising an entry associated with the mobile node, the entry comprising a mobile node identifier, a previous access network identifier, and a current access network identifier.

14. The computer-readable medium of claim 13, wherein the data structure is further operable to perform the following:
updating a tunnel connection operable to communicate a plurality of data packets between the current packet controller function and the packet data serving node by updating the entry associated with the mobile node.

15. A computer-readable medium encoded with a data structure operable to perform the following:
communicating, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receiving, through the tunnel, a registration request from a mobile node, the mobile node communicating with the current packet controller function;
determining, at the packet data serving node, whether the mobile node is serviced by a mobile Internet Protocol or a simple Internet Protocol;
determining, at the packet data serving node, whether the mobile node communicated with a previous packet controller function serviced by the packet data serving node;
deciding, at the packet data serving node, whether to negotiate a point-to-point session for the mobile node in response to the determinations;
if the mobile node is serviced by the simple Internet Protocol:
determining whether a first Internet Protocol address associated with the mobile node is the same as a second Internet Protocol address, the first Internet Protocol address associated with a message received from the mobile node, the second Internet Protocol address stored at the packet data serving node;
negotiating the point-to-point session, if the first Internet Protocol address is not the same as the second Internet Protocol address; and
updating the point-to-point session, if the first Internet Protocol address is the same as the second Internet Protocol address.

16. A system for optimizing point-to-point sessions comprising:
at least one packet data serving node operable to:
communicate with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receive, through the tunnel, a registration request from a mobile node, the mobile node communicating with the current packet controller function;
determine whether the registration request comprises a previous access network identifier identifying a previous packet controller function;
determine whether the mobile node is serviced by a mobile Internet Protocol;
determine whether the mobile node communicated with a previous packet controller function serviced by the packet data serving node; and
decide whether to negotiate a point-to-point session for the mobile node in response to the determinations; and
a plurality of packet controller functions communicating with the at least one packet data serving node.

17. The system of claim 16, wherein the registration request comprises a request for service from the at least one packet data serving node.

18. The system of claim 16, wherein the at least one packet data serving node is further operable to decide whether to negotiate the point-to-point session for the mobile node by:
negotiating the point-to-point session if the mobile node did not communicate with a previous packet controller function serviced by the packet data serving node; and
updating the point-to-point session if the mobile node communicated with a previous packet controller function serviced by the packet data serving node.

19. The system of claim 16, wherein the at least one packet data serving node is further operable to decide whether to negotiate the point-to-point session for the mobile node by:
determining whether there is a session context for the mobile node;
negotiating the point-to-point session if the mobile node did not communicate with a previous packet controller function serviced by the packet data serving node; and
updating the point-to-point session if the mobile node communicated with a previous packet controller function serviced by the packet data serving node.

20. The system of claim 16, wherein the at least one packet data serving node is further operable to:
determine whether the registration request comprises the previous access network identifier by:
determining that the registration request comprises the previous access network identifier; and
identifying the previous packet controller function from the previous access network identifier;
determine whether the mobile node communicated with the previous packet controller function by:
determining whether the previous packet controller function is serviced by the packet data serving node;
negotiating the point-to-point session if the previous packet controller function is not serviced by the packet data serving node; and
updating the point-to-point session if the previous packet controller function is serviced by the packet data serving node.

21. The system of claim 16, wherein the at least one packet data serving node is further operable to generate a table comprising an entry associated with the mobile node, the entry comprising a mobile node identifier, a previous access network identifier, and a current access network identifier.

22. The system of claim 21, wherein the at least one packet data serving node is further operable to update a tunnel connection operable to communicate a plurality of data packets between the current packet controller function and the packet data serving node by updating the entry associated with the mobile node.

23. The system of claim 16, wherein at least one of the packet controller functions is operable to:
communicate with the at least one packet data serving node; and
store an access network identifier identifying the at least one packet controller function.

24. The system of claim 16, wherein the at least one packet data serving node is further operable to establish a tunnel connection to communicate between the at least one packet controller function and the at least one packet data serving node.

25. A system for optimizing point-to-point sessions comprising:
at least one packet data serving node operable to:
communicate with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receive, through the tunnel, a registration request from a mobile node, the mobile node communicating with the current packet controller function;
determine whether the registration request comprises a previous access network identifier identifying a previous packet controller function;
determine whether the mobile node is serviced by a mobile Internet Protocol or a simple Internet Protocol;
determine whether the mobile node communicated with a previous packet controller function serviced by the packet data serving node; and
decide whether to negotiate a point-to-point session for the mobile node in response to the determinations; and
a plurality of packet controller functions communicating with the at least one packet data serving node; and
the at least one packet data serving node further operable to:
if the mobile node is serviced by the simple Internet Protocol:
determine whether a first Internet Protocol address associated with the mobile node is the same as a second Internet Protocol address associated with the mobile node, the first Internet Protocol address associated with a message received from the mobile node, the second Internet Protocol address stored at the packet data serving node;
negotiate the point-to-point session, if the first Internet Protocol address is not the same as the second Internet Protocol address; and
update the point-to-point session, if the first Internet Protocol address is the same as the second Internet Protocol address.

26. A packet data serving node for optimizing point-to-point sessions comprising:
a memory operable to store a table, the table comprising an entry corresponding to a mobile node, the entry comprising:
a mobile station identifier field operable to store a mobile station identifier; and
a previous access network identifier field operable to store a previous access network identifier;
a processor coupled to the memory and operable to:
communicate with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receive a registration request from the mobile node;
determine whether the registration request comprises a previous access network identifier identifying a previous packet controller function;
determine whether the mobile node is serviced by a mobile Internet Protocol;
determine whether the mobile node communicated with a previous packet controller function serviced by the packet data serving node; and
decide whether to negotiate a point-to-point session for the mobile node in response to the determinations.

27. The packet data serving node of claim 26, wherein the registration request comprises a request for service from the packet data serving node.

28. The packet data serving node of claim 26, wherein the processor is further operable to:
negotiate the point-to-point session if the mobile node did not communicate with a previous packet controller function serviced by the packet data serving node; and
updating the point-to-point session if the mobile node communicated with a previous packet controller function serviced by the packet data serving node.

29. The packet data serving node of claim 26, wherein the processor is further operable to:
determine whether there is a session context for the mobile node;
negotiate the point-to-point session if there is no session context; and
updating the point-to-point session if there is session context.

30. The packet data serving node of claim 26, wherein the processor is further operable to:
determine whether the registration request comprises the previous access network identifier by:
determining that the registration request comprises the previous access network identifier; and
identifying the previous packet controller function;
determine whether the mobile node communicated with the previous packet controller function by:
determining whether the previous packet controller function is serviced by the packet data serving node;
negotiate the point-to-point session if the previous packet controller function is not serviced by the packet data serving node; and
update the point-to-point session if the previous packet controller function is serviced by the packet data serving node.

31. The packet data serving node of claim 26, wherein the processor is further operable to:
identify the mobile station identifier in the registration request; and
retrieve the entry corresponding to the mobile station identifier from the table.

32. A packet data serving node for optimizing point-to-point sessions comprising:
a memory operable to store a table, the table comprising an entry corresponding to a mobile node, the entry comprising:
a mobile station identifier field operable to store a mobile station identifier; and
a previous access network identifier field operable to store a previous access network identifier;

a processor coupled to the memory and operable to:
communicate with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receive a registration request from the mobile node;
determine whether the registration request comprises a previous access network identifier identifying a previous packet controller function;
determine whether the mobile node is serviced by a mobile Internet Protocol or a simple Internet Protocol;
determine whether the mobile node communicated with a previous packet controller function serviced by the packet data serving node;
decide whether to negotiate a point-to-point session for the mobile node in response to the determinations;
if the mobile node is serviced by the simple Internet Protocol:
determine whether a first Internet Protocol address associated with the mobile node is the same as a second Internet Protocol address associated with the mobile node, the first Internet Protocol address associated with a message received from the mobile node, the second Internet Protocol address stored in the table;
negotiate the point-to-point session, if the first Internet Protocol address is not the same as the second Internet Protocol address; and
update the point-to-point session, if the first Internet Protocol address is the same as the second Internet Protocol address.

33. A computer-readable medium encoded with a data structure operable to:
communicate, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receive a registration request from a mobile node;
determine, at the packet data serving node, whether the registration request comprises a previous access network identifier identifying a previous packet controller function;
determine, at the packet data serving node, whether the mobile node is serviced by a mobile Internet Protocol;
determine, at the packet data serving node, whether the mobile node communicated with a previous packet controller function serviced by the packet data serving node; and
decide, at the packet data serving node, whether to negotiate a point-to-point session for the mobile node in response to the determinations.

34. The computer-readable medium of claim 33, wherein the data structure is operable to decide whether to negotiate a point-to-point session for the mobile node by:
negotiating the point-to-point session if the mobile node did not communicate with a previous packet controller function serviced by the packet data serving node; and
updating the point-to-point session if the mobile node communicated with a previous packet controller function serviced by the packet data serving node.

35. The computer-readable medium of claim 33, wherein the data structure is operable to decide whether to negotiate a point-to-point session for the mobile node by:
determining whether there is a session context for the mobile node;
negotiating the point-to-point session if there is no session context; and
updating the point-to-point session if there is session context.

36. The computer-readable medium of claim 33, wherein the data structure is further operable to:
determine whether the registration request comprises the previous access network identifier by:
determining that the registration request comprises the previous access network identifier; and
identifying the previous packet controller function from the previous access network identifier;
determine whether the mobile node communicated with the previous packet controller function by:
determining whether the previous packet controller function is serviced by the packet data serving node;
negotiate the point-to-point session if the previous packet controller function is not serviced by the packet data serving node; and
update the point-to-point session if the previous packet controller function is serviced by the packet data serving node.

37. The computer-readable medium of claim 33, wherein the data structure is further operable to generate a table comprising an entry associated with the mobile node, the entry comprising a mobile node identifier, a previous access network identifier, and a current access network identifier.

38. The computer-readable medium of claim 37, wherein the data structure is further operable to update a tunnel connection operable to communicate a plurality of data packets between the current packet controller function and the packet data serving node by updating the entry associated with the mobile node.

39. A computer-readable medium encoded with a data structure operable to:
communicate, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;
receive a registration request from a mobile node;
determine, at the packet data serving node, whether the registration request comprises a previous access network identifier identifying a previous packet controller function;
determine, at the packet data serving node, whether the mobile node is serviced by a mobile Internet Protocol or a simple Internet Protocol;
determine, at the packet data serving node, whether the mobile node communicated with a previous packet controller function serviced by the packet data serving node;

decide, at the packet data serving node, whether to negotiate a point-to-point session for the mobile node in response to the determinations;

if the mobile node is serviced by the simple Internet Protocol:

determine whether a first Internet Protocol address associated with the mobile node is the same as a second Internet Protocol address associated with the mobile node, the first Internet Protocol address associated with a message received from the mobile node, the second Internet Protocol address stored at a packet data serving node;

negotiate the point-to-point session, if the first Internet Protocol address is not the same as the second Internet Protocol address; and update the point-to-point session, if the first Internet Protocol address is the same as the second Internet Protocol address.

40. A system for optimizing point-to-point sessions comprising:

means for communicating, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;

means for receiving, through the tunnel, a registration request from a mobile node, the mobile node communicating with the current packet controller function;

a means for determining, at the packet data serving node, whether the registration request comprises a previous access network identifier identifying a previous packet controller function;

a means for determining, at the packet data serving node, whether the mobile node is serviced by a mobile Internet Protocol;

a means for determining, at the packet data serving node, whether the mobile node communicated with a previous packet controller function serviced by the packet data serving node; and a means for deciding, at the packet data serving node, whether to negotiate a point-to-point session for the mobile node in response to the determinations.

41. A computer-readable medium encoded with a data structure operable to perform the following:

communicating, by a packet data serving node, with a current packet controller function through a tunnel, the current packet controller function operating as a packet switch that provides a circuit service between the packet data serving node and a base station controller, the tunnel enabling the current packet controller function and the packet data serving node to communicate over an Internet Protocol-based network, the current packet controller function serviced by the packet data serving node;

receiving, through the tunnel, a registration request from a mobile node, the mobile node communicating with the current packet controller function;

determining, at a packet data serving node, whether the registration request comprises a previous access network identifier identifying a previous packet controller function;

determining, at the packet data serving node, whether the mobile node is serviced by a mobile Internet Protocol;

determining, at the packet data serving node, whether the mobile node communicated with a previous packet controller function serviced by the packet data serving node; and deciding, at the packet data serving node, whether to negotiate a point-to-point session for the mobile node in response to the determinations by:

negotiating the point-to-point session if the mobile node did not communicate through the previous packet controller function serviced by the packet data serving node; and updating the point-to-point session if the mobile node did communicate through the previous packet controller function serviced by the packet data serving node.

* * * * *